(No Model.)
P. & J. YOUNG.
APPARATUS FOR TIGHTENING TIRES.
No. 272,826. Patented Feb. 20, 1883.
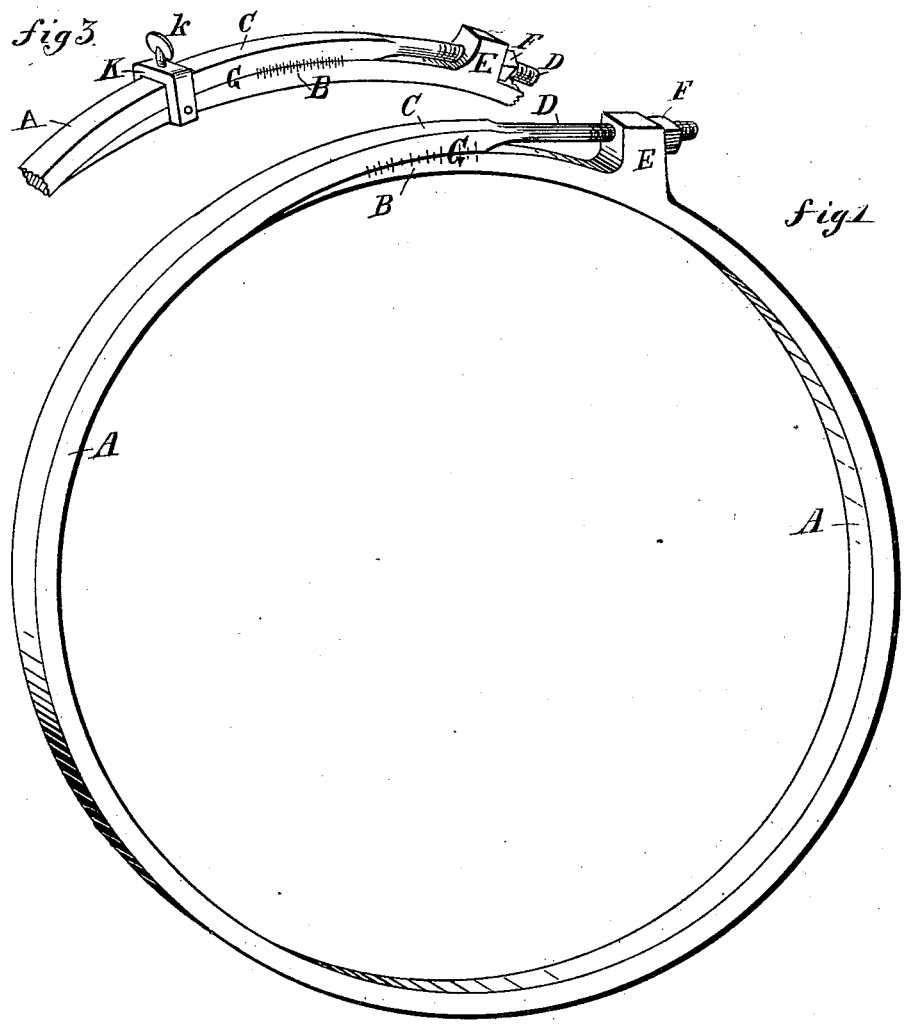
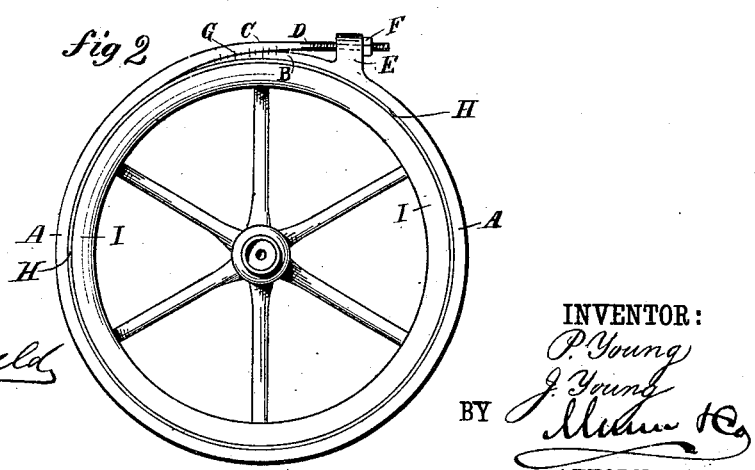
WITNESSES:
INVENTOR:
P. Young
J. Young
BY
ATTORNEYS.

UNITED STATES PATENT OFFICE.

PETER YOUNG AND JAMES YOUNG, OF MONTICELLO, IOWA.

APPARATUS FOR TIGHTENING TIRES.

SPECIFICATION forming part of Letters Patent No. 272,826, dated February 20, 1883.

Application filed April 5, 1882. (No model.)

To all whom it may concern:

Be it known that we, PETER YOUNG and JAMES YOUNG, of Monticello, Jones county, Iowa, have invented a new and Improved Method of and Apparatus for Tightening Wheel-Tires, of which the following is a full, clear, and exact description.

This invention consists of tightening the tires of wagon and other wheels, without removing the tires from the wheels, by heating a strong metal hoop or band of the size the tire should be when tightened, placing it while expanded by the heat upon the tire to be tightened, and then cooling the strong band to its original size, which band, being sufficiently strong, effectually compresses the metal of the wheel-tire and shortens it to the size wanted.

The invention also consists of a tire-tightening hoop or band for so tightening tires, and also of an adjustable contrivance for bands for this purpose, constructed so that one tightener may be used for tires of different sizes by being readily set, before heating, to the required size for the tire to be tightened, and also in a clamping device for temporarily securing the tightener around a wheel-tire, as hereinafter more fully described.

Reference is to be had to the accompanying drawings, forming part of this specification, in which similar letters of reference indicate corresponding parts in all the figures.

Figure 1 represents a perspective view of the improved tire-tightening device. Fig. 2 is a side elevation of a wheel with the tire-tightener applied, showing the method of tightening tires by the use of said tightener; and Fig. 3 is a partial perspective view of a modification of the tightener at the lap joint.

Referring more particularly to Figs. 1 and 2, A represents a strong hoop or band, of iron or steel, constructed, as shown, with one end tapered, as at B, so as to be overlapped by the other end, C, without destroying the regularity of the inner curvature where the two parts meet. From the lap B C the part C has a tangential extension, D, reduced to round form, and passing through a strong lug, E, on the outer face, back of the point B, where it is secured by a nut, F, screwed on against the lug, thus contriving the tightener so that it can be contracted or enlarged for tires H, varying to some extent in size, and at the lap there is a scale, G, by which the proper adjustment for tires of wheels I of certain sizes can be known.

Referring to Fig. 3, it will appear that the screw-threaded extension D may also be arranged to pass through the lug E close to the tightener, the said extension being curved to conform to the curvature of the tightener, instead of being tangential thereto, as in Figs. 1 and 2. This construction of Fig. 3 has the advantage of a more direct drawing action, and may in some cases be preferred. I have also shown in Fig. 3 the clamp K, of U form, fixed at its ends to the lower lap, B, of the joint, and having a stout screw, k, threaded through its top. The purpose of this clamp K is to temporarily and quickly secure the lap-joint together by the screw when the tightener is first adjusted to the wheel, the upper lap, C, of the joint being passed through the clamp and the threaded extension D through the lug E, the advantage of the clamp being that the tightener may be snugly secured on the wheel-tire at once without awaiting the more tedious adjustment of the nut F on the extension D, and avoiding the exposure of the inner surface of the heated tightener to the cooling effects of air-currents by clasping it closely to the wheel tire, thus rendering the tightener more effective in use by a better retention of its heat prior to the final drawing up of the tightener by the nut F. The use of the clamp K is, however, optional, and either the curved or tangential screw-threaded extension D may be used, as may be best suited for the work in hand.

Tighteners for wheels of any one size need not be constructed with the adjusting-joint; but for general use by blacksmiths and wheelwrights the adjustable tightener will be more serviceable, because some variations will generally be found even among wheels made to the same size.

The advantages of this method of tightening tires as compared with the common method will be seen at once in the fact that the tire does not require to be removed from the wheel, thereby saving considerable labor, and often preserving fastening-bolts and other devices used to secure the tire on the wheel.

Having thus described our invention, we claim as new and desire to secure by Letters Patent—

1. The method of tightening tires by applying thereto, as described, a heated and expanded metal band of greater power than the tire, said band being of the size, when cold, that the tire is required to be, and cooling said band on the tire, substantially as specified.

2. The improved tire-tightener consisting of a strong band of metal, A, having a lap-joint, B C, screw-threaded extension D, perforated lug E, and a nut, F, substantially as specified.

3. The improved tire-tightener consisting of a lap-jointed band, A, with lug E and adjusting nut and screw, and having a scale, G, on the lap-joint, substantially as specified.

4. In lap-jointed tire-tighteners, the clamp K, for temporarily securing the device around and close to the wheel-tire, substantially as specified.

5. The combination, in a tire-tightener, of the screw-threaded extension D and threaded lug E at the ends of the band, the clamp K, for temporary adjustment of the device to a wheel-tire, and of the drawing-nut F, substantially as and for the purposes set forth.

PETER YOUNG.
JAMES YOUNG.

Witnesses:
J. W. DOXSEE,
M. W. HERRICK.